(12) United States Patent
Falkenburg et al.

(10) Patent No.: US 9,329,703 B2
(45) Date of Patent: May 3, 2016

(54) INTELLIGENT STYLUS

(75) Inventors: David R. Falkenburg, San Jose, CA (US); David I. Simon, San Francisco, CA (US); Jonah A. Harley, Mountain View, CA (US); Andrea Mucignat, San Francisco, CA (US); Brian Richards Land, Redwood City, CA (US); Christopher Tenzin Mullens, San Francisco, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 13/166,711

(22) Filed: Jun. 22, 2011

(65) Prior Publication Data

US 2012/0331546 A1 Dec. 27, 2012

(51) Int. Cl.
 *G06F 3/0354* (2013.01)
 *G06F 21/83* (2013.01)
 *G06F 21/36* (2013.01)

(52) U.S. Cl.
 CPC ............ *G06F 3/03545* (2013.01); *G06F 21/36* (2013.01); *G06F 21/83* (2013.01)

(58) Field of Classification Search
 USPC ................................ 345/179; 726/16; 702/50
 See application file for complete search history.

(56) References Cited

U.S. PATENT DOCUMENTS

| | | | |
|---|---|---|---|
| 3,462,692 A | 8/1969 | Bartlett | |
| 3,970,846 A | 7/1976 | Schofield et al. | |
| 4,220,815 A | 9/1980 | Gibson et al. | |
| 4,281,407 A | 7/1981 | Tosima | |
| 4,289,927 A | 9/1981 | Rodgers | |
| 4,320,292 A | 3/1982 | Oikawa et al. | |
| 4,334,219 A | 6/1982 | Paülus et al. | |
| 4,345,248 A | 8/1982 | Togashi et al. | |
| 4,405,921 A | 9/1983 | Mukaiyama | |
| 4,439,855 A | 3/1984 | Dholakia | |
| 4,476,463 A | 10/1984 | Ng et al. | |
| 4,481,510 A | 11/1984 | Hareng et al. | |
| 4,484,179 A | 11/1984 | Kasday | |
| 4,490,607 A | 12/1984 | Pease et al. | |
| 4,496,981 A | 1/1985 | Ota | |
| 4,520,357 A | 5/1985 | Castleberry et al. | |
| 4,542,375 A | 9/1985 | Alles et al. | |
| 4,602,321 A | 7/1986 | Bornhorst | |

(Continued)

FOREIGN PATENT DOCUMENTS

| | | | |
|---|---|---|---|
| CN | 1243282 A | 2/2000 | |
| CN | 1278348 A | 12/2000 | |

(Continued)

OTHER PUBLICATIONS

Final Office Action mailed Oct. 11, 2012, for U.S. Appl. No. 12/566,455, filed Sep. 24, 2009, eight pages.

(Continued)

*Primary Examiner* — Kenneth B Lee, Jr.
(74) *Attorney, Agent, or Firm* — Morrison & Foerster LLP

(57) ABSTRACT

An intelligent stylus is disclosed. The stylus can provide a stylus condition in addition to a touch input. The stylus architecture can include multiple sensors to sense information indicative of the stylus condition, a microcontroller to determine the stylus condition based on the sensed information, and a transmitter to transmit the determined condition to a corresponding touch sensitive device so as to cause some action based on the condition.

20 Claims, 11 Drawing Sheets

(56) References Cited

U.S. PATENT DOCUMENTS

| | | |
|---|---|---|
| 4,603,356 A | 7/1986 | Bates |
| 4,642,459 A | 2/1987 | Caswell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A * | 11/1994 | Stein et al. ............... 345/179 |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |

(56) References Cited

U.S. PATENT DOCUMENTS

| | | | |
|---|---|---|---|
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,462,328 B2 | 10/2002 | Toyoda |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 * | 10/2009 | Black ............... 382/124 |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |
| 8,537,126 B2 | 9/2013 | Yousefpor et al. |
| 8,552,986 B2 | 10/2013 | Wong et al. |
| 8,605,045 B2 | 12/2013 | Mamba et al. |
| 8,659,556 B2 | 2/2014 | Wilson |
| 8,698,769 B2 | 4/2014 | Coulson et al. |
| 8,847,899 B2 | 9/2014 | Washburn et al. |
| 8,928,635 B2 | 1/2015 | Harley et al. |
| 2001/0000026 A1 * | 3/2001 | Skoog ............... 382/119 |
| 2001/0000676 A1 | 5/2001 | Zhang et al. |

(56) References Cited

U.S. PATENT DOCUMENTS

| | | |
|---|---|---|
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer |
| 2003/0218116 A1 | 11/2003 | den Boer |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1* | 7/2004 | Wang et al. .................. 345/179 |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0026521 A1 | 2/2006 | Hotelling et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0216905 A1 | 9/2007 | Han et al. |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | de Boer et al. |
| 2008/0142280 A1 | 6/2008 | Yamamoto et al. |
| 2008/0156546 A1 | 7/2008 | Hauck |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0153152 A1 | 6/2009 | Maharyta et al. |
| 2009/0153525 A1 | 6/2009 | Chang |
| 2009/0167702 A1 | 7/2009 | Nurmi |
| 2009/0167728 A1 | 7/2009 | Geaghan et al. |
| 2009/0184939 A1 | 7/2009 | Wohlstadter et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |

(56) References Cited

U.S. PATENT DOCUMENTS

| | | | |
|---|---|---|---|
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0155153 A1 | 6/2010 | Zachut |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0315384 A1 | 12/2010 | Hargreaves et al. |
| 2010/0315394 A1 | 12/2010 | Katoh et al. |
| 2010/0327882 A1 | 12/2010 | Shahparnia et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1* | 4/2011 | Maridakis ............ 345/179 |
| 2011/0169771 A1 | 7/2011 | Fujioka et al. |
| 2011/0175834 A1 | 7/2011 | Han et al. |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304592 A1 | 12/2011 | Booth et al. |
| 2012/0013555 A1 | 1/2012 | Maeda et al. |
| 2012/0019488 A1* | 1/2012 | McCarthy ............ 345/179 |
| 2012/0050207 A1 | 3/2012 | Westhues et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1* | 4/2012 | Leto ..................... 345/174 |
| 2012/0105362 A1 | 5/2012 | Kremin et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1* | 11/2012 | Adhikari ............... 345/179 |
| 2012/0320000 A1 | 12/2012 | Takatsuka |
| 2012/0327040 A1 | 12/2012 | Simon |
| 2012/0327041 A1 | 12/2012 | Harley |
| 2012/0327042 A1 | 12/2012 | Harley |
| 2013/0027361 A1 | 1/2013 | Perski et al. |
| 2013/0069905 A1 | 3/2013 | Krah et al. |
| 2013/0088465 A1 | 4/2013 | Geller et al. |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0257793 A1 | 10/2013 | Zeliff et al. |
| 2014/0028576 A1 | 1/2014 | Shahparnia |
| 2014/0028577 A1 | 1/2014 | Krah |
| 2014/0028607 A1 | 1/2014 | Tan |
| 2014/0267075 A1 | 9/2014 | Shahparnia et al. |
| 2015/0035768 A1 | 2/2015 | Shahparnia et al. |
| 2015/0035769 A1 | 2/2015 | Shahparnia |
| 2015/0035797 A1 | 2/2015 | Shahparnia |
| 2015/0103049 A1 | 4/2015 | Harley et al. |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319-A2 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 2 040 149 A2 | 3/2009 |
| EP | 2 172 834 A2 | 4/2010 |
| EP | 2 221 659 A1 | 8/2010 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | H05243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| TW | 200743986 A | 12/2007 |
| TW | 200925944 | 6/2009 |
| TW | 201115414 A | 5/2011 |
| TW | 201118682 A1 | 6/2011 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2011/008533 A2 | 1/2011 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569-A2 A3 | 3/2013 |

(56) References Cited

FOREIGN PATENT DOCUMENTS

| WO | WO-2014/018233 A1 | 1/2014 |
|---|---|---|
| WO | WO-2014/143430 A1 | 9/2014 |
| WO | WO-2015/017196 A1 | 2/2015 |

OTHER PUBLICATIONS

Final Office Action mailed Oct. 25, 2012, for U.S. Appl. No. 12/568,302, filed Spetember 28, 2009, 14 pages.
Final Office Action mailed Oct. 25, 2012, for U.S. Appl. No. 12/568,316, filed Sep. 28, 2009, 16 pages.
Non-Final Office Action mailed Nov. 15, 2012, for U.S. Appl. No. 12/566,477, filed Sep. 24, 2009, 12 pages.
International Search Report mailed Jan. 16, 2013, for PCT Application No. PCT/US2012/043021, filed Jun. 18, 2012, six pages.
Non-Final Office Action mailed Nov. 17, 2011, for U.S. Appl. No. 11/977,339, filed Oct. 24, 2007, six pages.
Non-Final Office Action mailed Jan. 10, 2012, for U.S. Appl. No. 11/977,864, filed Oct. 26, 2007, nine pages.
Notification of Reasons for Rejection mailed Dec. 19, 2011, for JP Patent Application No. 2008-540205, with English Translation, six pages.
International Search Report mailed Feb. 18, 2013, for PCT Application No. PCT/US2012/043025, filed Jun. 18, 2012, six pages.
Non-Final Office Action mailed Mar. 5, 2013, for U.S. Appl. No. 13/166,726, filed Jun. 22, 2011, 14 pages.
Non-Final Office Action mailed Mar. 14, 2013, for U.S. Appl. No. 13/166,743, filed Jun. 22, 2011, 17 pages.
Non-Final Office Action mailed Mar. 29, 2013, for U.S. Appl. No. 13/166,699, filed Jun. 22, 2011, 17 pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Abileah, A. et al. (2004). "59.3: Integrated Optical Touch Panel in a 14.1' AMLCD," *SID '04 Digest* (Seattle) pp. 1544-1547.
Abileah, A. et al. (2006). "9.3: Optical Sensors Embedded within Amlcd Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Anonymous. (2002). "Biometric Smart Pen Project," located at http://wvvw.biornetricsmartpen.de/ . . . , last visited Apr. 19, 2011, one page.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC 2007* pp. 132-133, 592.
Den Boer, W. et al. (2003). "56.3: Active Matrix LCD with Integrated Optical Touch Screen," *SID '03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action mailed Mar. 4, 2004, for U.S. Appl. No. 10/217,798, filed Aug. 12, 2002, 17 pages.
Final Office Action mailed Jan. 21, 2005, for U.S. Appl. No. 10/329,217, filed Dec. 23, 2002, 13 pages.
Final Office Action mailed Aug. 9, 2005, for U.S. Appl. No. 10/442,433, filed May 20, 2003, 13 pages.
Final Office Action mailed Aug. 23, 2005, for U.S. Appl. No. 10/217,798, filed Aug. 12, 2002, 10 pages.
Final Office Action mailed Dec. 13, 2005, for U.S. Appl. No. 10/371,413, filed Feb. 20, 2003, seven pages.
Final Office Action mailed May 23, 2007, for U.S. Appl. No. 11/137,753, filed May 25, 2005, 12 pages.
Final Office Action mailed Oct. 18, 2007, for U.S. Appl. No. 11/351,098, filed Feb. 8, 2006, six pages.
Final Office Action mailed Oct. 31, 2007, for U.S. Appl. No. 10/217,798, filed Aug. 12, 2002, 10 pages.
Final Office Action mailed Mar. 24, 2009, for U.S. Appl. No. 11/351,098, filed Feb. 8, 2006, 11 pages.
Final Office Action mailed Feb. 10, 2011, for U.S. Appl. No. 11/901,649, filed Sep. 18, 2007, 20 pages.
Hong, S.J. et al. (2005). "Smart LCD Using a-Si Photo Sensor," *IMID '05 Digest* pp. 280-283.
International Preliminary Report on Patentability and Written Opinion mailed Oct. 8, 2004, for PCT Application No. PCT/US03/05300, filed Feb. 20, 2003, 15 pages.
International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002 two pages.
International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Peter Pazmany Catholic University, Budapest, Hungary 122 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Jun. 4, 2003, for U.S. Appl. No. 10/217,798, filed Aug. 12, 2002, 17 pages.
Non-Final Office Action mailed May 21, 2004, for U.S. Appl. No. 10/329,217, filed Dec. 23, 2002, 14 pages.
Non-Final Office Action mailed Sep. 21, 2004, for U.S. Appl. No. 10/442,433, filed May 20, 2003, seven pages.
Non-Final Office Action mailed Nov. 26, 2004, for U.S. Appl. No. 10/307,106, filed Nov. 27, 2002, nine pages.
Non-Final Office Action mailed Dec. 10, 2004, for U.S. Appl. No. 10/217,798, filed Aug. 12, 2002, 10 pages.
Non-Final Office Action mailed Jan. 21, 2005, for U.S. Appl. No. 10/347,149, filed Jan. 17, 2003, 10 pages.
Non-Final Office Action mailed Apr. 15, 2005, for U.S. Appl. No. 10/371,413, Filed Feb. 20, 2003, five pages.
Non-Final Office Action mailed Jun. 22, 2005, for U.S. Appl. No. 10/739,455, filed Dec. 17, 2003, 11 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, eight pages.
Non-Final Office Action mailed Aug. 28, 2006, for U.S. Appl. No. 10/371,413, filed Feb. 20, 2003, seven pages.
Non-Final Office Action mailed Jun. 28, 2007, for U.S. Appl. No. 11/351,098, filed Feb. 8, 2006, 13 pages.
Non-Final Office Action mailed Jun. 29, 2007, for U.S. Appl. No. 10/217,798, filed Aug. 12, 2002, 11 pages.
Non-Final Office Action mailed Feb. 25, 2008, for U.S. Appl. No. 11/137,753, filed May 25, 2005, 16 pages.
Non-Final Office Action mailed Jun. 24, 2008, for U.S. Appl. No. 11/351,098, filed Feb. 8, 2006, 12 pages.
Non-Final Office Action mailed Jun. 25, 2009, for U.S. Appl. No. 11/980,029, filed Oct. 29, 2007, 10 pages.
Non-Final Office Action mailed Nov. 23, 2009, for U.S. Appl. No. 11/407,545, filed Apr. 19, 2006, six pages.
Non-Final Office Action mailed Jul. 29, 2010, for U.S. Appl. No. 11/901,649, filed Sep. 18, 2007, 22 pages.
Non-Final Office Action mailed Oct. 13, 2010, for U.S. Appl. No. 11/978,006, filed Oct. 25, 2007, nine pages.
Non-Final Office Action mailed Oct. 14, 2010, for U.S. Appl. No. 11/595,071, filed Nov. 8, 2006, eight pages.

(56) References Cited

OTHER PUBLICATIONS

Non-Final Office Action mailed Nov. 26, 2010, for U.S. Appl. No. 11/977,279, filed Oct. 24, 2007, 10 pages.
Non-Final Office Action mailed Nov. 26, 2010, for U.S. Appl. No. 11/977,830, filed Oct. 26, 2007, eight pages.
Non-Final Office Action mailed Dec. 13, 2010, for U.S. Appl. No. 11/977,339, filed Oct. 24, 2007, nine pages.
Non-Final Office Action mailed Feb. 1, 2011, for U.S. Appl. No. 11/978,031, filed Oct. 25, 2007, 20 pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Provisional U.S. Appl. No. 60/359,263 filed Feb. 20, 2002, by den Boer et al. (copy not attached).
Provisional U.S. Appl. No. 60/383,040 filed May 23, 2002, by Abileah et al. (copy not attached).
Provisional U.S. Appl. No. 60/736,708 filed Nov. 14, 2005, by den Boer et al. (copy not attached).
Provisional U.S. Appl. No. 60/821,325 filed Aug. 3, 2006, by Abileah et al. (copy not attached).
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Final Office Action mailed May 18, 2011, for U.S. Appl. No. 11/978,031, filed Oct. 25, 2007, 17 pages.
Anonymous. (2002). "Biometric Smart Pen Project," located at http://www.biometricsmartpen.de/ . . . , last visited Apr. 19, 2011, one page.
Brown, C. et al. (2007). "7.2: A 2.6 inch VGA LCD with Optical Input Function using a 1-Transistor Active-Pixel Sensor," *SSCC 2007* pp. 132-133, 592.
International Search Report mailed Sep. 21, 2007, for PCT Application No. PCT/US06/43741, filed Nov. 10; 2006, one page.
Kis, A. (2006). "Tactile Sensing and Analogic Algorithms," Ph.D. Dissertation, Péter Pázmány Catholic University, Budapest, Hungary 122 pages.
Non-Final Office Action mailed Nov. 26, 2004, for U.S. Appl. 10/307,106, filed Nov. 27, 2002, nine pages.
Final Office Action mailed Jun. 15, 2011, for U.S. Appl. No. 11/595,071, filed Nov. 8, 2006, 9 pages.
Final Office Action mailed Jun. 24, 2011, for U.S. Appl. No. 11/978,006, filed Oct. 25, 2007, 12 pages.
Final Office Action mailed Jul. 5, 2011, for U.S. Appl. No. 11/977,279, filed Oct. 24, 2007, 12 pages.
Non-Final Office Action mailed Jun. 21, 2011, for U.S. Appl. No. 11/977,339, filed Oct. 24, 2007, 11 pages.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, nine pages.
Final Office Action mailed Sep. 29, 2011, for U.S. Appl. No. 11/977,911, filed Oct. 26, 2007, 22 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Final Office Action mailed Jul. 26, 2013, for U.S. Appl. No. 13/166,726, filed Jun. 22, 2011, ten pages.
Final Office Action mailed Jan. 13, 2014, for U.S. Appl. No. 12/568,316, filed Sep. 28, 2009, 15 pages.
International Search Report mailed Apr. 23, 2014, for PCT Application No. PCT/US2014/013927, filed Jan. 30, 2014, four pages.
Non-Final Office Action mailed Feb. 27, 2014, for U.S. Appl. No. 11/977,279, filed Oct. 24, 2007, 11 pages.
Non-Final Office Action mailed Mar. 14, 2014, for U.S. Appl. No. 11/977,339, filed Oct. 24, 2007, 9 pages.
Non-Final Office Action mailed Apr. 24, 2014, for U.S. Appl. No. 13/560,958, filed Jul. 27, 2012, nine pages.
Non-Final Office Action mailed May 8, 2014, for U.S. Appl. No. 13/560,973, filed Jul. 27, 2012, six pages.
Non-Final Office Action mailed Jun. 4, 2014, for U.S. Appl. No. 13/560,963, filed Jul. 27, 2012, nine pages.
Notice of Allowance mailed May 12, 2014, for U.S. Appl. No. 13/166,726, filed Jun. 22, 2011, nine pages.
Final Office Action mailed Oct. 31, 2013, for U.S. Appl. No. 13/166,699, filed Jun. 22, 2011, 13 pages.
International Search Report mailed Sep. 12, 2013, for PCT Application No. PCT/US2013/048977, filed Jul. 1, 2013, 4 pages.
Non-Final Office Action mailed Sep. 18, 2013, for U.S. Appl. No. 13/652,007, filed Oct. 15, 2012, 16 pages.
Notice of Allowance mailed Feb. 3, 2014, for U.S. Appl. No. 13/166,726, filed Jun. 22, 2011, nine pages.
Final Office Action mailed Apr. 28, 2014, for U.S. Appl. No. 13/652,007, filed Oct. 15, 2012, 16 pages.
Non-Final Office Action mailed Jun. 27, 2014, for U.S. Appl. No. 13/166,699, filed Jun. 22, 2011, 13 pages.
Final Office Action mailed Dec. 2, 2014, for U.S. Appl. No. 13/560,963, filed Jul. 27, 2012, ten pages.
Final Office Action mailed Dec. 16, 2014, for U.S. Appl. No. 13/560,958, filed Jul. 27, 2012, 12 pages.
International Search Report mailed Oct. 30, 2014, for PCT Application No. PCT/US2014/047658, filed Jul. 22, 2014, four pages.
Notice of Allowance mailed Sep. 4, 2014, for U.S. Appl. No. 13/166,726, filed Jun. 22, 2011, nine pages.
Search Report dated Jun. 12, 2014, for ROC (Taiwan) Patent Application No. 101122110, one page.
TW Search Report dated Jul. 7, 2014, for TW Patent Application No. 101122109, filed Jun. 20, 2012, one page.
TW Search Report dated Jul. 8, 2014, for TW Patent Application No. 101122107, filed Jun. 20, 2012, one page.
Final Office Action mailed Jan. 12, 2015, for U.S. Appl. No. 13/560,973, filed Jul. 27, 2012, six pages.
Final Office Action mailed May 4, 2015, for U.S. Appl. No. 13/166,699, filed Jun. 22, 2011, 17 pages.
Non-Final Office Action mailed May 14, 2015, for U.S. Appl. No. 13/560,963, filed Jul. 27, 2012, twelve pages.
Non-Final Office Action mailed May 22, 2015, for U.S. Appl. No. 13/831,318, filed Mar. 14, 2013, eight pages.
Chinese Search Report dated Sep. 6, 2015, for CN Application No. CN 201280030349.9, with English translation, six pages.
Non-Final Office Action mailed Jun. 28, 2011, for U.S. Appl. No. 12/852,883, filed Aug. 8, 2010, 16 pages.

\* cited by examiner

INTELLIGENT STYLUS

FIELD

This relates generally to touch sensing and more particularly, to providing an intelligent stylus for use with a touch sensitive device.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

When a stylus has been used as an input device, the stylus has traditionally provided simply a touch input to a touch sensitive device without additional information that can be helpful to operation of the touch sensitive device.

SUMMARY

This relates to an intelligent stylus that can provide a stylus condition in addition to a touch input. The stylus sensing circuitry can include multiple sensors to sense information indicative of the stylus condition, a microcontroller to determine the stylus condition based on the sensed information, and a transmitter to transmit the determined condition to a corresponding touch sensitive device to cause some action based on the condition. The stylus's ability to determine its condition and provide that condition to the touch sensitive device advantageously improves touch and hover sensing and increases device capabilities.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to an intelligent stylus that includes sensing circuitry to provide the stylus condition in addition to a touch input. The sensing circuitry can include multiple sensors to sense information indicative of the stylus condition, a microcontroller to determine the stylus condition based on the sensed information, and a transmitter to transmit the determined condition to a corresponding touch sensitive device to cause some action based on the condition. The stylus's ability to determine its condition and provide that condition to the touch sensitive device advantageously improves touch and hover sensing and increases panel capabilities. Additionally, the stylus can be used with the touch sensitive device to provide these advantages without making design modifications to the panel.

Although some embodiments are described herein in terms of a stylus, it is to be understood that other input devices and/or pointing devices can be used according to various embodiments.

Although some embodiments are described herein in terms of a touch sensitive device, it is to be understood that any device capable of sensing a touch or hover event thereat and/or processing the sensed event can be used according to various embodiments. The touch sensitive device (or any other suitable device) can include touch sensing circuitry for touch and hover sensing and, in some instances, a processor and memory for touch and hover data processing.

Figure 1:
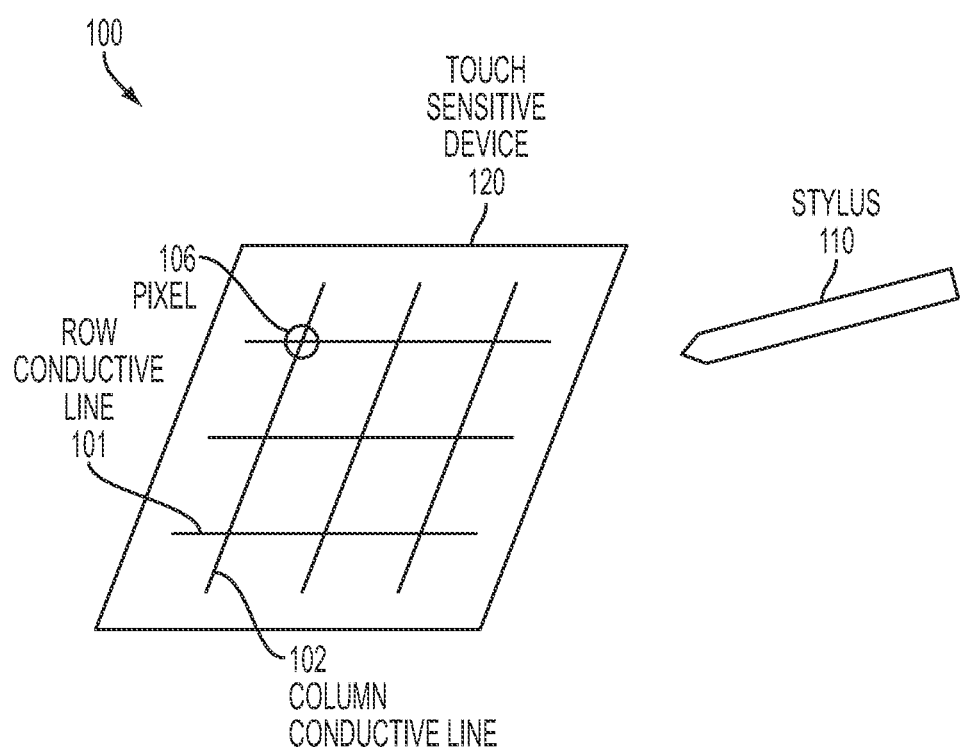
FIG. 1 illustrates an exemplary intelligent stylus for use with a touch sensitive device according to various embodiments.

FIG. 1 illustrates an exemplary intelligent stylus for use with a touch sensitive device according to various embodiments. In the example of FIG. 1, touch sensitive device 120 can include an array of pixels 106 formed at the crossing points of conductive rows 101 and columns 102. Though FIG. 1 depicts the conductive elements 101, 102 in rows and columns, other configurations of conductive elements are also possible according to various embodiments.

When stylus 110 touches or hovers over a surface of the touch sensitive device 120, the stylus can form a capacitance with one or more of the conductive rows 101 and/or columns 102 that can be detected by device sensing circuitry (not shown). The stylus touch can be represented in an image captured at the touch sensitive device 120 and processed for touch input information, e.g., the location on the touch sensitive device that the stylus touched or hovered over.

In addition to providing the touch input information, the stylus 110 can provide information sensed by the stylus regarding its condition, which can be used by the touch sensitive device 120 to perform some action. In some embodiments, the information can be used by the stylus to perform some action. The stylus 110 can include multiple sensors to provide information about its condition, where the sensors can be selectively used alone or in various combinations. The ability to provide information beyond simply touch input information, particularly information about the stylus's condition that the stylus determines itself, gives this stylus an intelligence absent from a traditional stylus.

Figure 2:
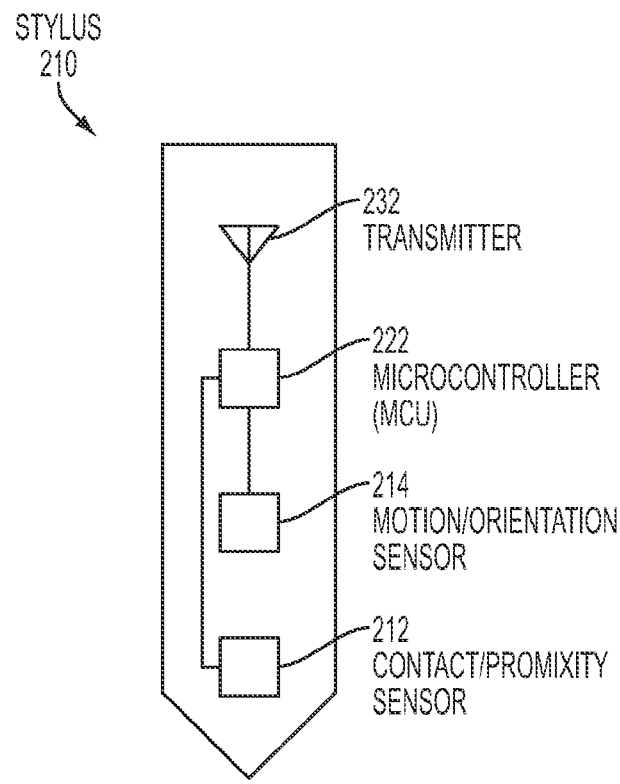
FIG. 2 illustrates exemplary sensing circuitry of an intelligent stylus according to various embodiments.

FIG. 2 illustrates a cross-sectional view of an exemplary intelligent stylus having sensing circuitry according to various embodiments. In the example of FIG. 2, stylus 210 can include contact/proximity sensor 212, motion/orientation sensor 214, microcontroller (MCU) 222, and transmitter 232. The contact/proximity sensor 212 can sense a touch at the stylus tip by an object or a proximity of the stylus to an object. In some embodiments, the contact/proximity sensor 212 can be a capacitive sensor, a resistive sensor, a force sensor, or any other suitable sensor capable of sensing a touch at or proximity to the stylus. The motion/orientation sensor 214 can sense the motion and/or orientation of the stylus. In some embodiments, the motion/orientation sensor 214 can be an accelerometer, a gyroscope, an magnetometer, or any other suitable six degree-of-freedom sensor capable of sensing a motion and/or orientation of the stylus.

In some embodiments, an additional contact/proximity sensor can be disposed at the stylus non-tip end to sense a touch at that end of the stylus by an object or a proximity of that end of the stylus to an object.

The MCU 222 can receive, select, and process stylus sensor measurements to determine a condition of the stylus. For example, the MCU 222 can receive a contact/proximity measurement from the contact/proximity sensor 212 and determine the stylus's condition as touching (contacting) or hovering over (proximate to) a surface. Similarly, the MCU 222 can receive a motion/orientation measurement from the motion/orientation sensor 214 and determine the stylus's condition as moving in a particular direction at a particular pace. The MCU 222 can also receive a motion/orientation measurement and determine the stylus's condition as having a particular orientation. Similarly, the MCU 222 can receive both contact/proximity and motion/orientation measurements and determine the stylus's condition as moving on a surface. In some embodiments, the MCU 222 can be a single application specific integrated circuit (ASIC) that can include one or more programmable processors, random access memory (RAM), and input-output (I/O) ports. In some embodiments, the MCU 222 can also include data compression software and/or hardware.

For the additional contact/proximity sensor at the stylus non-tip end, the MCU can determine the stylus's condition at the non-tip end as touching or hovering over a surface, e.g., to emulate an eraser.

The transmitter 232 can transmit stylus information, e.g., the stylus's condition, from the MCU 222 to a touch sensitive device (or some other device in communication with the stylus) and cause the device to perform some action based on the transmitted information. For example, the transmitter 232 can transmit that the stylus is touching or hovering over the touch sensitive device, causing the device to perform some touch operation, such as displaying writing or drawings or executing a program corresponding to the location the stylus touched. The transmitter 232 can transmit that the stylus is moving at an angle along the touch sensitive device, causing the device to display a thicker line corresponding to the stylus angle and the stylus motion. The transmitter 232 can transmit that the stylus has rotated at least 180 degrees so that the eraser end of the stylus is touching the touch sensitive device, causing the device to erase the displayed information. The transmitter 232 can be wireless or wired. Transmission between the transmitter 232 and the touch sensitive device can be via WiFi, Bluetooth, zigbee, RFID, NFC, ultrasound, and the like.

In addition to a stylus, other input devices can transmit input information and/or condition information to the touch sensitive device, thereby causing an action based on the information, according to various embodiments. For example, a bar code scanner can transmit bar code data and/or a condition of the scanner to the touch sensitive device to cause the device and/or the scanner to perform some action based on the transmitted information. A camera can transmit images and videos and/or a camera condition to the touch sensitive device to cause the device and/or the camera to perform some action based on the transmitted information. An ultrasound device can transmit ultrasound data and/or a condition of the device to the touch sensitive device to cause the touch sensitive device and/or the ultrasound device to perform some action based on the transmitted information. An NFC/RFID reader can transmit product identification codes and/or a condition of the reader to the touch sensitive device to cause the device and/or the reader to perform some action based on the transmitted information. Other input devices performing similarly can be used according to various embodiments. Transmission between the input devices' transmitters and the touch sensitive device can be via WiFi, Bluetooth, zigbee, RFID, NFC, ultrasound, and the like.

In some embodiments, the transmitter 232 can be replaced with a transceiver, such that the stylus can both send signals to the touch sensitive device and receive signals from the touch sensitive device. For example, after the touch sensitive device performs its action based on the information sent from the stylus, the device can send a signal back to the stylus indicating that the action is complete or requesting some action by the stylus in return.

In some embodiments, the motion/orientation sensor 214 can be used to sense a wake-up motion of the stylus 210. For example, a user can move the stylus 210 in a predetermined motion to power up the stylus. Note that powering up can be from a low power mode to a full power mode and powering down can be the reverse. In some embodiments, the predetermined motion can be programmed into the stylus to be unique to the user. Such a motion can in effect be a stylus password. The motion/orientation sensor 214 can sense the motion and transmit it to the MCU 222 for processing. The MCU 222 can recognize the motion and power up the stylus. A similar process can be done for powering down the stylus 210. The transmitter 232 can transmit that the stylus is powered either up or down to the touch sensitive device.

Although only two sensors are illustrated in FIG. 2, it is to be understood that additional and/or other sensors can be used according to the requirements of the stylus. Examples of additional sensors will be described below. The sensors can be selectively used in the stylus alone or in various combinations. Also, the sensing circuitry is not limited to the sensors, the MCU, and the transmitter illustrated here, but can include additional and/or other components capable of determining a condition of an intelligent stylus according to various embodiments.

Figure 3:
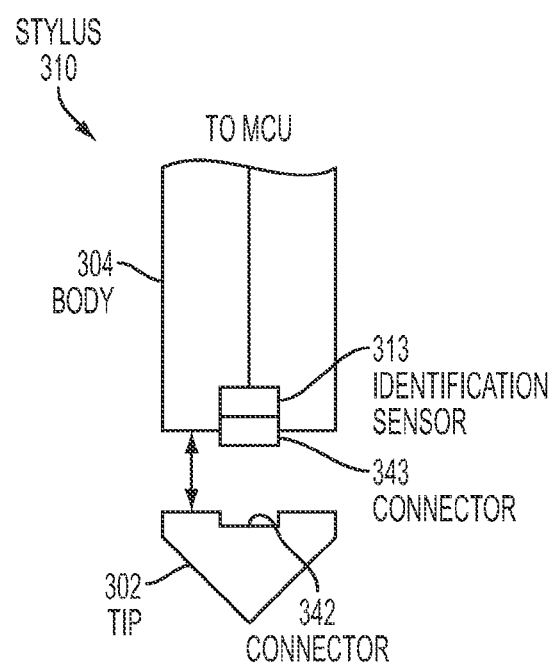
FIG. 3 illustrates an exemplary intelligent stylus with a replaceable tip according to various embodiments.

FIG. 3 illustrates a cross-sectional view of an exemplary intelligent stylus with a replaceable tip according to various embodiments. In the example of FIG. 3, stylus 310 can include replaceable tip 302 having connector 342 embedded therein to connect to connector 343 in stylus body 304. The tip connector 342 can have a unique identification code that identifies the particular tip 302. The body connector 343 can have an identification sensor 313 to sense the code upon connecting with the tip connector 342. The identification sensor 313 can transmit the code to the MCU for processing. The code can be used by the MCU to determine how the stylus will be used and can be used by the touch sensitive device to perform some action based on that use. For example, if the code indicates that the replaceable tip is a stylus brush, the MCU can determine that the stylus will be used as a brush and the touch sensitive device can perform an action according to brush motions and touches.

The body connector 343 can also have a unique identification code that identifies the stylus owner. The identification sensor 313 can transmit the owner code to the MCU for processing. The owner code can be used by the MCU to identify the owner and by the touch sensitive device to perform some action based on that owner. For example, if two stylus users interact with the touch sensitive device, the panel can differentiate between the two users' inputs and use different colors, symbols, fonts, etc., or otherwise distinguish between the users and/or interact differently with each user according to the owner code. In some embodiments, the body connector 343 can be programmable, so that the current user can program in his/her unique identification code when using the stylus and delete the code when done. The MCU and the touch sensitive device can then operate based on that particular user's code.

The body connector 343 can also have a unique identification code that identifies the stylus itself. The identification sensor 313 can transmit the stylus code to the MCU, which can then transmit the stylus code to the touch sensitive device. The touch sensitive device can then perform some action based on the stylus code. For example, the touch sensitive device can authenticate the stylus as being an acceptable input device for the panel and can accept stylus input if the stylus is authenticated and deny stylus input if the stylus is not. The touch sensitive device can also display or speak the authentication result to the user.

Figure 4:
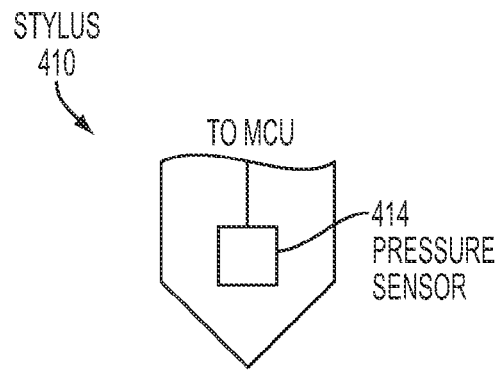
FIG. 4 illustrates an exemplary intelligent stylus with sensing circuitry including a pressure sensor according to various embodiments.

FIG. 4 illustrates a cross-sectional view of an exemplary intelligent stylus with sensing circuitry that includes a pressure sensor according to various embodiments. In the example of FIG. 4, stylus 410 can include pressure sensor 414. The pressure sensor 414 can sense a force being applied by the stylus to a surface and can transmit a force measurement to the MCU for processing. The MCU can determine that the stylus is applying force to a surface and/or the amount of force being applied and can transmit that determination to the touch sensitive device. The touch sensitive device can then perform some action based on the applied force. For example, the touch sensitive device can display a darker, thicker image for a heavier force and a lighter, thinner image for a lighter force.

In some embodiments, the pressure sensor 414 can act in combination with the motion/orientation sensor 214 of FIG. 2 to provide motion and pressure measurements to the MCU. The MCU can then determine the cadence of the stylus as a user signs with the stylus. The touch sensitive device can use the determined cadence to verify the user's signature.

Figure 5:
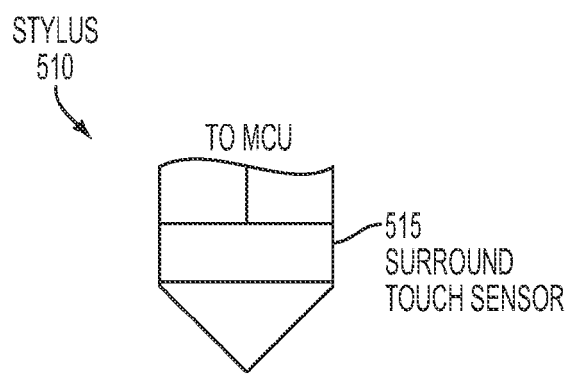
FIG. 5 illustrates an exemplary intelligent stylus with sensing circuitry including a surrounding touch sensor according to various embodiments.

FIG. 5 illustrates a cross-sectional view of an exemplary intelligent stylus with sensing circuitry that includes a surrounding touch sensor according to various embodiments. In the example of FIG. 5, stylus 510 can include surrounding touch sensor 515, which can encircle the stylus body at the stylus handheld position. The touch sensor 515 can sense a position of a hand holding the stylus and can transmit a touch measurement to the MCU for processing. The MCU can determine how the hand is holding the stylus and can transmit that determination to the touch sensitive device. The touch sensitive device can then perform some action based on the hand position. For example, the touch sensitive device can display or speak a message to the user that the hand position is correct, too low on the stylus, too light on the stylus and so on and how the hand position can be adjusted or changed.

Alternatively, the MCU can extract fingerprints from the touch measurement and can identify the user of the stylus. The MCU can transmit the user identification to the touch sensitive device. The touch sensitive device can then perform some action based on the identification. For example, the touch sensitive device can authenticate the user of the stylus and can accept stylus input if the user is authenticated and deny stylus input if the user is not. The touch sensitive device can also display or speak the authentication result to the user.

Figure 6:
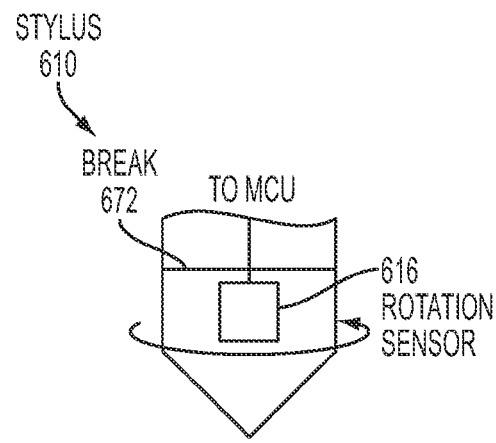
FIG. 6 illustrates an exemplary intelligent stylus with sensing circuitry including a rotation sensor according to various embodiments.

FIG. 6 illustrates a cross-sectional view of an exemplary intelligent stylus with sensing circuitry that includes a rotation sensor according to various embodiments. In the example of FIG. 6, stylus 610 can include rotation sensor 616. The rotation sensor 616 can sense a rotation of a portion of the stylus. Here the stylus body can be in two parts separated by a break 672, so that the two parts can rotate independently. The rotation sensor 616 can sense when one or both parts rotate away from a default position and can transmit a rotation measurement to the MCU for processing. The MCU can determine a stylus mode or setting based on the rotation measurement and can transmit that determination to the touch sensitive device. The touch sensitive device can then perform some action based on the stylus mode or setting. For example, the touch sensitive device can know from the stylus that the stylus is in a color mode and can display any stylus inputs in color, or that the stylus is in an erase mode and can erase any displayed information where the stylus touches, and so on.

In some embodiments, the MCU can power up the stylus upon receipt of a rotation indication from the rotation sensor 616. The MCU can then send a determination that the stylus is powered up to the touch sensitive device. Similar actions can be done for a power down of the stylus. Alternatively, the MCU can send the stylus's condition as rotated to the touch sensitive device and the touch sensitive device can then send a signal back to the stylus to either power up or power down.

Figure 7:
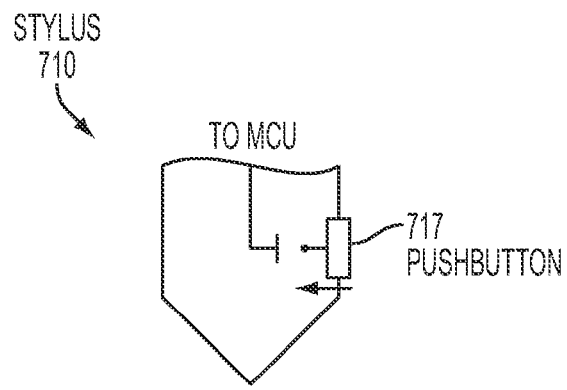
FIG. 7 illustrates an exemplary intelligent stylus with sensing circuitry including a pushbutton according to various embodiments.

FIG. 7 illustrates a cross-sectional view of an exemplary intelligent stylus with sensing circuitry that includes a pushbutton according to various embodiments. In the example of FIG. 7, stylus 710 can include pushbutton 717. The pushbutton 717 can sense a push thereon and can transmit the push indication to the MCU for processing. The MCU can determine a stylus setting change based on the push indication and can transmit that determination to the touch sensitive device. The touch sensitive device can then perform some action based on the stylus setting change. For example, the touch sensitive device can change the color of stylus writing displayed at the panel when the pushbutton is pushed.

In some embodiments, the MCU can power up the stylus upon receipt of a push indication from the pushbutton 717. The MCU can then send a determination that the stylus is powered up to the touch sensitive device. Similar actions can be done for a power down of the stylus. Alternatively, the MCU can send the stylus's push indication to the touch sensitive device and the touch sensitive device can then send a signal back to the stylus to either power up or power down.

Figure 8:
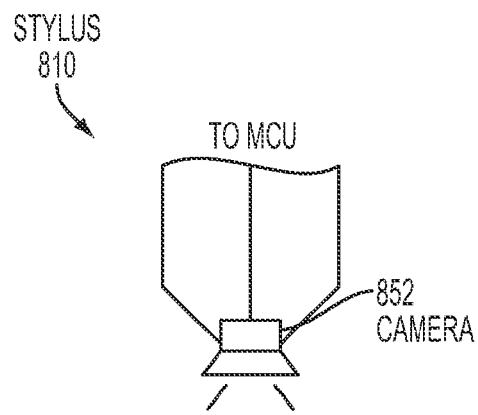
FIG. 8 illustrates an exemplary intelligent stylus with sensing circuitry including a camera according to various embodiments.

FIG. 8 illustrates a cross-sectional view of an exemplary intelligent stylus with sensing circuitry that includes a camera according to various embodiments. In the example of FIG. 8, stylus 810 can include camera 852. The camera 852 can capture images and/or video and transmit the captured images and/or video to the MCU for processing. The MCU can extract relevant information from the captured images and/or video about the stylus's location, environment, motion, orientation, and the like or about the touch sensitive device's displayed information, position, motion, orientation, and the like. The MCU can transmit the extracted information to the touch sensitive device, which can then perform some action based on that information. For example, the touch sensitive device can confirm its orientation and location based on information sent from the stylus.

The camera 852 can be mounted in a replaceable tip with a unique identification code that can be transmitted to the MCU to identify the camera, as described previously. The camera identification code can indicate to the MCU that the incoming information includes captured images and/or video for processing.

Figure 9:
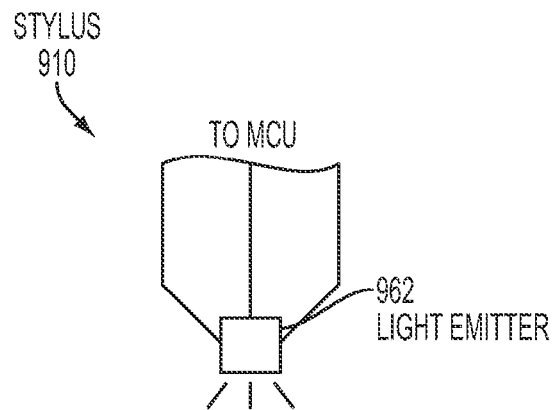
FIG. 9 illustrates an exemplary intelligent stylus with sensing circuitry including a light emitter according to various embodiments.

FIG. 9 illustrates a cross-sectional view of an exemplary intelligent stylus with sensing circuitry that includes a light emitter according to various embodiments. In the example of FIG. 9, stylus 910 can include light emitter 962. The light emitter 962 can emit light onto a proximate surface and can transmit an indication that light is being emitted to the MCU for processing. The MCU can determine that the stylus is acting as a light source and can transmit that determination to the touch sensitive device, which can then perform some action based on that determination. For example, suppose the touch sensitive device has optical sensors. The determination that the stylus is emitting light can be used by the touch sensitive device to detect the emission and perform some action based on the location relative to the panel, the duration, etc., of the detected emission. Alternatively, the touch sensitive device can know that the stylus is currently acting as a light source (e.g., a flashlight) and await the stylus's return to being an input device for the panel.

The light emitter 962 can be mounted in a replaceable tip with a unique identification code that can be transmitted to the MCU to identify the light emitter. The light emitter identification code can indicate to the MCU that the incoming information includes a light indication for processing.

Figure 10:
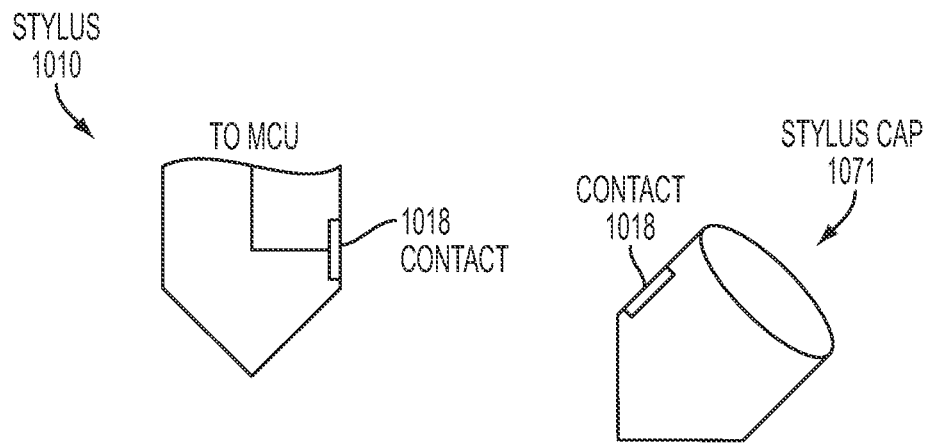
FIG. 10 illustrates an exemplary intelligent stylus with sensing circuitry including contact sensors disposed on the stylus and on a removable stylus cap according to various embodiments.

FIG. 10 illustrates a cross-sectional view of an exemplary intelligent stylus with sensing circuitry including contact sensors according to various embodiments. In the example of FIG. 10, stylus 1010 can include removable stylus cap 1071 with contact 1018 embedded therein. The stylus body can have corresponding contact 1018 embedded therein. When the cap 1071 covers the stylus tip, the contacts 1018 can be engaged and can transmit an indication to the MCU for processing. The MCU can determine that the cap covers the stylus and can transmit that determination to the touch sensitive device. The touch sensitive device can then perform some action based on that determination. For example, the touch sensitive device can know that the stylus is not in usage and can await an indication that the stylus cap has been removed so as to receive stylus input.

In some embodiments, the MCU can power up the stylus upon receipt of a indication from the contacts 1018 that the stylus cap has been removed. Conversely, the MCU can power down the stylus upon receipt of an indication from the contacts 1018 that the stylus cap has been placed on the stylus. The MCU can send a determination that the stylus is powered either up or down to the touch sensitive device. Alternatively, the MCU can send the stylus's cap condition to the touch sensitive device and the touch sensitive device can send a signal back to the stylus to either power up or power down.

In some embodiments, the contacts 1018 can act in combination with the motion/orientation sensor 214 of FIG. 2 to provide contact and motion measurements to the MCU. The MCU can then use the measurements to determine whether the stylus cap covers the stylus and whether the stylus is moving. If the cap have been off the stylus for a particular amount of time and the stylus has not been moving, the MCU can determine that the stylus is not in use and can power down the stylus. Conversely, if the stylus is powered down and begins to move with the cap off, the MCU can power up the stylus. The MCU can send a determination that the stylus is powered either up or down to the touch sensitive device. Alternatively, the MCU can send the stylus' cap and motion conditions to the touch sensitive device and the touch sensitive device can send a signal back to the stylus to either power up or power down.

Figure 11:
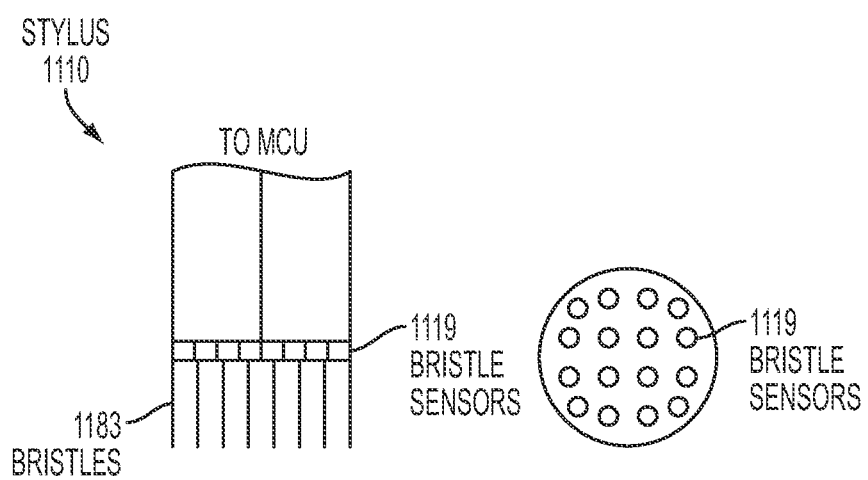
FIG. 11 illustrates an exemplary bristle-tipped intelligent stylus with sensing circuitry including bristle sensors according to various embodiments.

FIG. 11 illustrates a cross-sectional view of an exemplary intelligent brush-tipped stylus with sensing circuitry including bristle sensors according to various embodiments. In the example of FIG. 11, stylus 1110 can include a brush tip having multiple bristles 1183, each bristle having a bristle sensor 1119. FIG. 11 shows a plan view of the bristle sensors 1119. The bristles sensors 1119 can detect force applied to a surface by the bristles 1183 and the deflection of the bristles on the surface. The bristle sensors 1119 can transmit force and deflection measurements to the MCU for processing. The MCU can determine that the stylus bristles are applying force to a surface and/or the amounts of force applied and that the stylus bristles are deflected on the surface and/or the amounts of deflection. The MCU can transmit the determination to the touch sensitive device, which can then perform some action based on the determination. For example, the touch sensitive device can display a pattern corresponding to the deflection pattern, where the thickness or darkness of the pattern corresponds to the amounts of force applied.

In some embodiments, the bristle sensors 1119 can act in combination with the motion/orientation sensors 214 of FIG. 2 to provide force, deflection, and motion measurements. The MCU can then determine the brushing motion of the stylus. The touch sensitive device can use the determined brushing motion to fill in a displayed area, for example.

Figure 12:
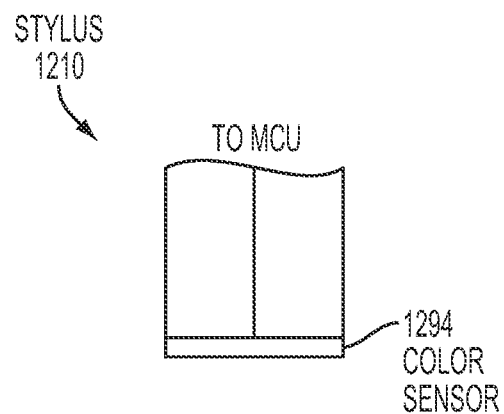
FIG. 12 illustrates an exemplary intelligent stylus with sensing circuitry including a color sensor according to various embodiments.

The brush can be mounted in a replaceable tip with a unique identification code that can be transmitted to the MCU to identify the brush. The brush identification code can indicate to the MCU that the incoming information includes bristle force and deflection measurements for processing FIG. 12 illustrates a cross-sectional view of an exemplary intelligent stylus with sensing circuitry including a color sensor according to various embodiments. In the example of FIG. 12, stylus 1210 can include color sensor 1294. The color sensor 1294 can detect a color at a proximate surface and transmit the detected color measurement to the MCU for processing. In some embodiments, the color sensor 1294 can be a colorimeter. The MCU can determine the color components from the measurement and transmit the determined components to the touch sensitive device, which can perform some action based on the components. For example, the touch sensitive device can display the detected color using the transmitted components. The touch sensitive device can also change the font colors or some other display feature to that of the transmitted components. The touch sensitive device can additionally store the color information for later use.

The color sensor 1294 can be mounted in a replaceable tip with a unique identification code that can be transmitted to the MCU to identify the sensor. The sensor identification code can indicate to the MCU that the incoming information includes color measurements for processing.

Figure 13:
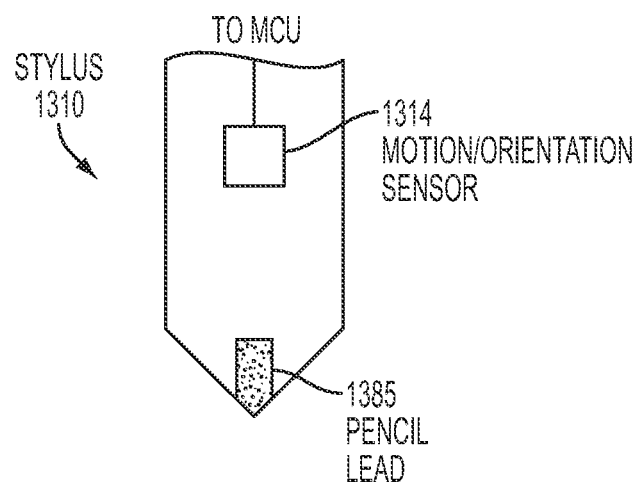
FIG. 13 illustrates an exemplary lead-tipped intelligent stylus with sensing circuitry according to various embodiments.

FIG. 13 illustrates a cross-sectional view of an exemplary intelligent lead-tipped stylus with sensing circuitry according to various embodiments. In the example of FIG. 13, stylus 1310 can include lead tip 1385 for writing on real paper. The lead tip 1385 can act in combination with motion/orientation sensor 1314 (same as sensor 214 of FIG. 2) to provide motion measurements of the lead tip 1385 as it writes on the real paper. The motion measurements can be transmitted to the MCU for processing. The MCU can determine that the stylus is writing on real paper, based on the lead tip's identification code, and can transfer the determination along with the writing motions to the touch sensitive device, which can perform some action based on the measurements. For example, the touch sensitive device can reproduce the writing from the real paper electronically on the touch sensitive device. In some embodiments, the motion/orientation sensor 1314 can also provide orientation measurements of the lead tip 1385 as it writes on the real paper and transmit the orientation measurements to the MCU for processing. The MCU can determine a thickness of the writing based on the orientation and can transfer that determined thickness to the touch sensitive device. The touch sensitive device can then reproduce the writing from the real paper, including the thickness of the writing strokes, electronically on the touch sensitive device.

The lead can be mounted in a replaceable tip with a unique identification code that can be transmitted to the MCU to identify the lead tip. The lead tip identification code can indicate to the MCU that the incoming information includes writing for processing.

Figure 14:
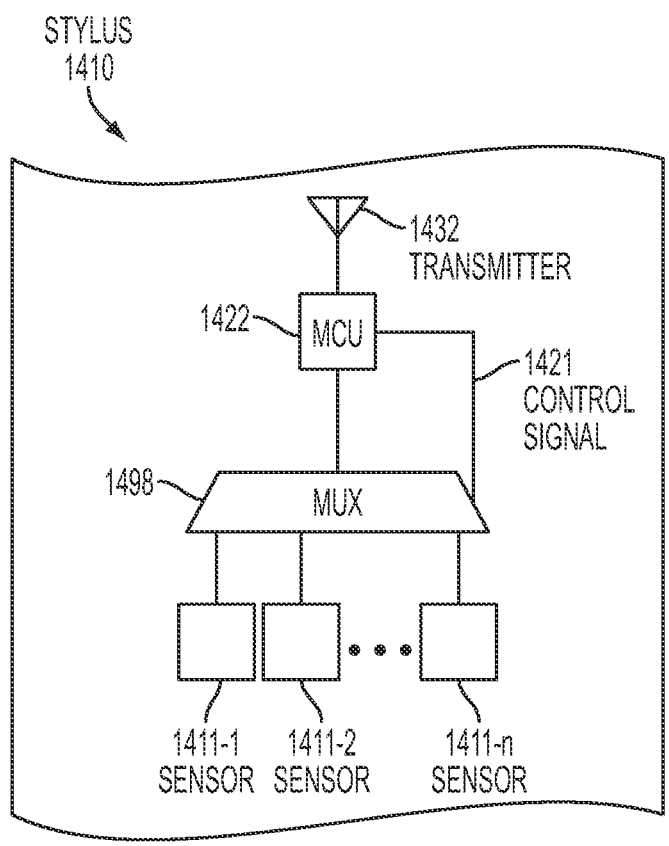
FIG. 14 illustrates an exemplary intelligent stylus with sensing circuitry including a microcontroller for selecting multiple sensors according to various embodiments.

As described previously, the intelligent stylus can include multiple sensors that can be used alone or in various combinations to determine the stylus's condition. The stylus sensing circuitry can be scalable, such that the stylus can use none of the sensors and act as simply a touch input device for a minimal touch sensitive device or the stylus can use one or more of the sensors and act as an intelligent device for a maximal touch sensitive device having logic to interpret and process all the various combinations of stylus sensor information. FIG. 14 illustrates exemplary scalable stylus sensing circuitry within a stylus according to various embodiments. In the example of FIG. 14, stylus 1410 can include multiplexer (MUX) 1498 (or any suitable switch) coupled to MCU 1422 and multiple sensors 1411 for selecting which sensor(s) to enable and transmit a measurement to the MCU for processing. The MCU 1422 can send control signal 1421 to the MUX 1498 to indicate which sensors 1411 to select. The selection can be made according to the capabilities of the touch sensitive device in communication with the stylus via transmitter 1432. The selection can also be made according to the purpose of the stylus.

Figure 15:
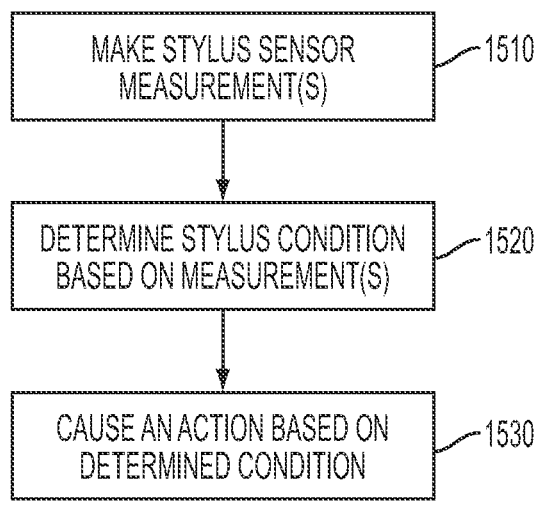
FIG. 15 illustrates an exemplary method for detecting a condition of an intelligent stylus according to various embodiments.

FIG. 15 illustrates an exemplary method for detecting a condition of an intelligent stylus according to various embodiments. In the example of FIG. 15, one or more sensors can selectively make a stylus measurement (1510). A stylus condition can be determined from the sensor measurements (1520). Examples of a stylus condition can include the stylus being in use, the stylus having a particular orientation, the stylus moving, the stylus making a brushing motion, the stylus being held, the stylus being used by a particular user, and so on. The determined condition can cause an action therefrom (1530). In some embodiments, the condition can be transmitted to a touch sensitive device, for example, causing the touch sensitive device to perform an action. The touch sensitive device can then display some information, update the display with new information, execute a function, or perform some other appropriate action based on the condition. Alternatively, the condition can be transmitted to a component of the stylus, such as the power supply, for example, causing the stylus component to perform an action. The stylus can then switch between low and full power or perform some other appropriate action based on the condition.

Figure 16:
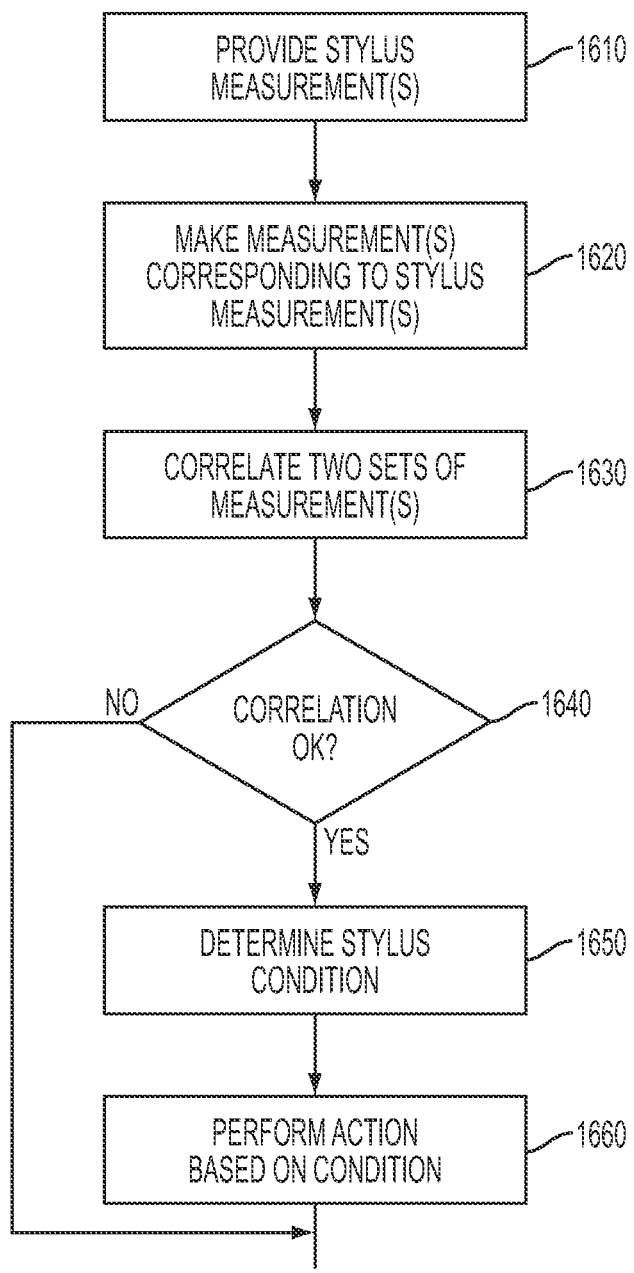
FIG. 16 illustrates another exemplary method for detecting a condition of an intelligent stylus according to various embodiments.

FIG. 16 illustrates another exemplary method for detecting a condition of an intelligent stylus according to various embodiments. In the example of FIG. 16, one or more stylus measurements can be provided (1610). The stylus measurements can be provided by the stylus itself and transmitted to a touch sensitive device for processing. One or more sensors can selectively make measurements corresponding to the stylus measurements (1620). The measurements can be made by the touch sensitive device, for example, in communication with the stylus. The measurements can be made coincident with the stylus measurements and based on the same operation(s) by the stylus and/or the touch sensitive device. The two sets of measurements can be correlated (1630). The correlation can include comparing the two sets of measurements and determining how close the two sets are. If close, the measurements can be considered correct. If not close, the measurements can be considered in error and can be discarded. If the correlation is favorable (1640), a stylus condition can be determined from the measurements (1650). The fact that the correlation is favorable can confirm that the subsequently determined stylus condition is valid. Examples of a stylus condition are described above regarding FIG. 15. An action can be performed based on the determined stylus condition (1660). The action can be performed by the touch sensitive device or by the stylus, for example. Example actions are described above regarding FIG. 15. In some embodiments, as part of the performed action, a signal can be transmitted from the touch sensitive device to the stylus to cause the stylus to perform an action based on the determined stylus condition.

In alternate embodiments, a stylus can use its stylus measurements to determine its condition and then provide the determined condition. A touch sensitive device can use its measurements to also determine the stylus condition. The touch sensitive device can then correlate the provided stylus condition with its determined stylus condition to confirm the condition. If the condition is confirmed, the touch sensitive device can then perform an associated action. The stylus can also perform an associated action.

Figure 17:
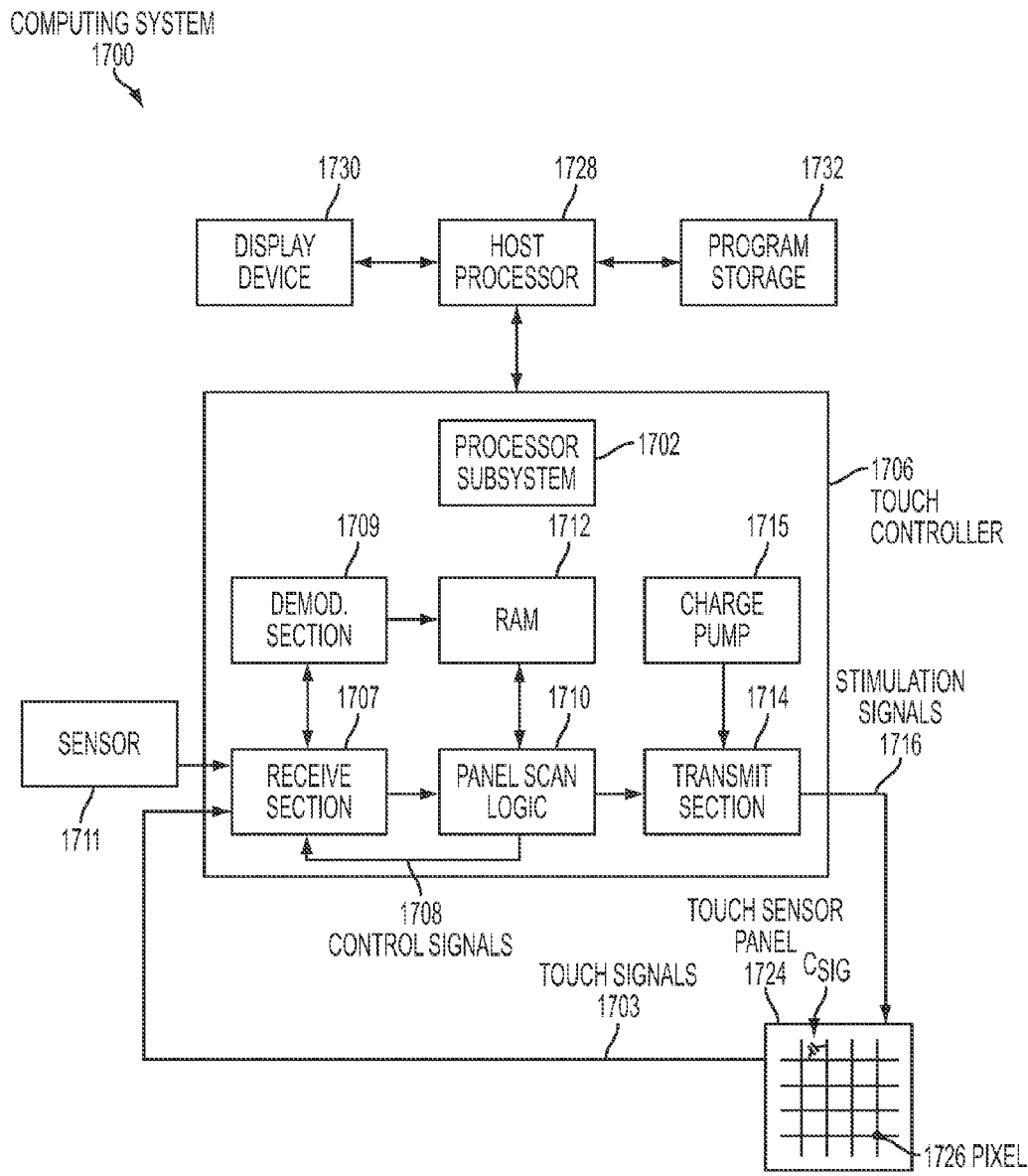
FIG. 17 illustrates an exemplary computing system for use with an intelligent stylus according to various embodiments.

FIG. 17 illustrates an exemplary computing system that can use an intelligent stylus according to various embodiments. In the example of FIG. 17, computing system 1700 can include touch controller 1706. The touch controller 1706 can be a single application specific integrated circuit (ASIC) that can include one or more processor subsystems 1702, which can include one or more main processors, such as ARM968 processors or other processors with similar functionality and capabilities. However, in other embodiments, the processor functionality can be implemented instead by dedicated logic, such as a state machine. The processor subsystems 1702 can also include peripherals (not shown) such as random access memory (RAM) or other types of memory or storage, watchdog timers and the like. The touch controller 1706 can also include receive section 1707 for receiving signals, such as touch (or sense) signals 1703 of one or more sense channels (not shown), other signals from other sensors such as sensor 1711, etc. The touch controller 1706 can also include demodulation section 1709 such as a multistage vector demodulation engine, panel scan logic 1710, and transmit section 1714 for transmitting stimulation signals 1716 to touch panel 1724 to drive the panel. The scan logic 1710 can access RAM 1712, autonomously read data from the sense channels, and provide control for the sense channels. In addition, the scan logic 1710 can control the transmit section 1714 to generate the stimulation signals 1716 at various frequencies and phases that can be selectively applied to rows of the touch panel 1724.

The touch controller 1706 can also include charge pump 1715, which can be used to generate the supply voltage for the transmit section 1714. The stimulation signals 1716 can have amplitudes higher than the maximum voltage by cascading two charge store devices, e.g., capacitors, together to form the charge pump 1715. Therefore, the stimulus voltage can be higher (e.g., 6V) than the voltage level a single capacitor can handle (e.g., 3.6V). Although FIG. 17 shows the charge pump 1715 separate from the transmit section 1714, the charge pump can be part of the transmit section.

Computing system 1700 can include host processor 1728 for receiving outputs from the processor subsystems 1702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1728 can also perform additional functions that may not be related to touch processing, and can be connected to program storage 1732 and display device 1730 such as an LCD for providing a UI to a user of the device. Display device 1730 together with touch panel 1724, when located partially or entirely under the touch panel, can form a touch screen.

Touch panel 1724 can include a capacitive sensing medium having drive lines and sense lines. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines can be driven by stimulation signals 1716 and resulting touch signals 1703 generated in sense lines can be transmitted to receive section 1707 in touch controller 1706. In this way, drive lines and sense lines can be part of the touch and hover sensing circuitry that can interact to form capacitive sensing nodes, which can be thought of as touch picture elements (touch pixels), such as touch pixels 1726. This way of understanding can be particularly useful when touch panel 1724 can be viewed as capturing an "image" of touch. In other words, after touch controller 1706 has determined whether a touch or hover has been detected at each touch pixel in the touch panel, the pattern of touch pixels in the touch panel at which a touch or hover occurred can be thought of as an "image" of touch (e.g. a pattern of fingers touching or hovering over the touch panel).

An intelligent stylus according to various embodiments can touch or hover over the touch panel 1724 to provide touch input information. The intelligent stylus can transmit additional information about the stylus condition to the processor subsystem 1702 or to the host processor 1728 for processing. The processor subsystem 1702 or the host processor 1728 can include logic to interpret and process the additional information from the intelligent stylus.

Note that one or more of the functions described above, can be performed, for example, by firmware stored in memory (e.g., one of the peripherals) and executed by the processor subsystem 1702, or stored in the program storage 1732 and executed by the host processor 1728. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch panel, as described in FIG. 17, can sense touch and hover according to various embodiments. In addition, the touch panel described herein can be either single- or multi-touch.

Figure 18:
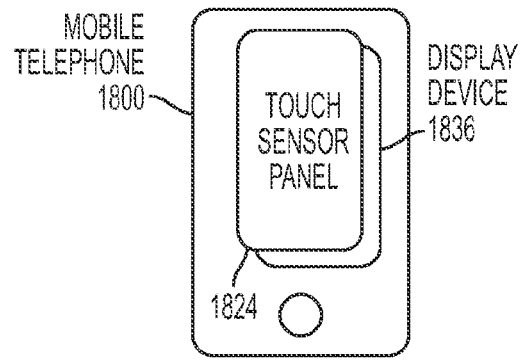
FIG. 18 illustrates an exemplary mobile telephone for use with an intelligent stylus according to various embodiments.

FIG. 18 illustrates an exemplary mobile telephone 1800 that can include touch panel 1824, display device 1836, and other computing system blocks for use with an intelligent stylus according to various embodiments.

Figure 19:
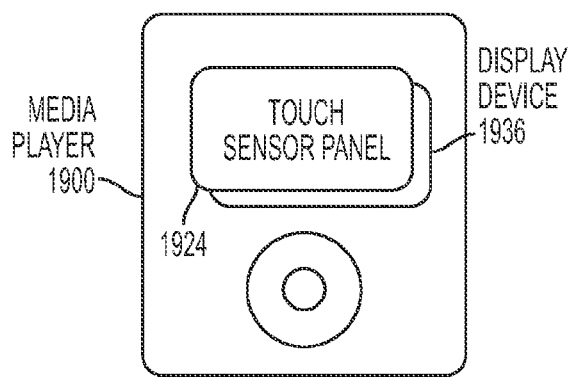
FIG. 19 illustrates an exemplary digital media player for use with an intelligent stylus according to various embodiments.

FIG. 19 illustrates an exemplary digital media player 1900 that can include touch panel 1924, display device 1936, and other computing system blocks for use with an intelligent stylus according to various embodiments.

Figure 20:
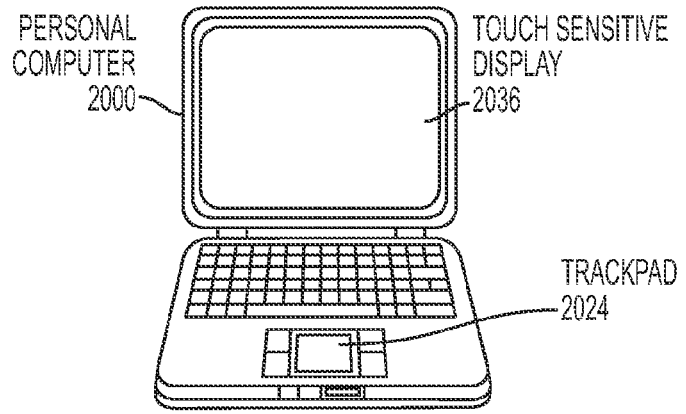
FIG. 20 illustrates an exemplary personal computer for use with an intelligent stylus according to various embodiments.

FIG. 20 illustrates an exemplary personal computer 2000 that can include touch pad 2024, display 2036, and other computing system blocks for use with an intelligent stylus according to various embodiments.

The mobile telephone, media player, and personal computer of FIGS. 18 through 20 can improve touch and hover sensing and improve device capabilities by utilizing a stylus according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. An input device comprising:
a first sensor configured to detect a contact or a proximity of the input device to an object;
a second sensor configured to detect at least one of a motion or an orientation of the input device;
a third sensor configured to detect a hand position on a surface of the input device, wherein the third sensor is a touch sensor and the touch sensor encircles the input device at a portion corresponding to a handled position of the input device;
a controller capable of determining a plurality of conditions of the input device, the plurality of conditions including at least a first condition of the input device based on the combination of the detected contact or the detected proximity and at least one of the detected motion or the detected orientation of the input device, and a second condition of the input device based on the detected hand position on the surface of the input device; and
a transmitter configured to transmit the plurality of determined conditions so as to cause an action based thereon.

2. The input device of claim 1, comprising:
a fourth sensor configured to detect a force applied by the input device,
wherein the controller is further capable of determining at least one of the plurality of conditions of the input device based on the detected force.

3. The input device of claim 1, comprising:
a fourth sensor configured to detect a rotation of a portion of the input device,
wherein the controller is further capable of determining at least one of the plurality of conditions of the input device based on the detected rotation.

4. The input device of claim 1, comprising:
a fourth sensor configured to detect a button push at the input device,
wherein the controller is further capable of determining at least one of the plurality of conditions of the input device based on the detected button push.

5. The input device of claim 1, comprising:
a fourth sensor configured to detect contact between the input device and a removable cap for encapsulating a distal end of the input device,
wherein the controller is capable of determining at least one of the plurality of conditions of the input device based on the detected contact.

6. The input device of claim 1, comprising:
a fourth sensor configured to detect a contact or a proximity of the input device to the object,
wherein the first sensor is located at a distal end of the input device and the fourth sensor is located at a proximal end of the input device, wherein the controller is further capable of determining at least one of the plurality of conditions of the input device based on the first or fourth sensor.

7. The input device of claim 1, comprising:
a switch coupled to the sensors and the controller,
wherein the switch is capable of receiving a signal from the controller so as to enable transmission of one or more detection parameters from the sensor to the controller.

8. The method for detecting a condition of an input device, the method comprising:
determining an orientation of the input device based on measurement from one or more of a plurality of sensors of the input device, the determined orientation measuring an angle of the input device; and
causing a writing action or erasing action to be performed based on the measured angle.

9. An input device comprising:
a replaceable tip having an identification code associated therewith;
multiple sensors configured to detect multiple parameters of the input device;
a controller capable of identifying the tip based on the identification code and selecting from the detected parameters; and
a transmitter capable of transmitting the tip identification and information associated with the selected parameters so as to cause an action based thereon.

10. The input device of claim 9, wherein the replaceable tip comprises a camera capable of capturing an image, the controller is capable of receiving the captured image, and the transmitter is capable of transmitting information associated with the captured image so as to cause the action.

11. The input device of claim 9, wherein the replaceable tip comprises a light source capable of emitting light, the controller is capable of receiving a parameter indicative of the emitted light, and the transmitter is capable of transmitting information associated with the parameter indicative of the emitted light so as to cause the action.

12. The input device of claim 9, wherein the replaceable tip comprises a brush and multiple brush bristle sensors to detect at least one of force applied by or deflection of the brush bristles, the controller is capable of receiving at least one parameter indicative of at least one of the detected force or the detected deflection, and the transmitter is capable of transmitting information associated with the at least one parameter indicative of at least one of the detected force or the detected deflection so as to cause the action.

13. The input device of claim 9, wherein the replaceable tip comprises a color sensor to detect a color at a proximate surface, the controller is capable of receiving a parameter indicative of the detected color, and the transmitter is capable of transmitting information associated with the parameter indicative of the detected color so as to cause the action.

14. The input device of claim 9, wherein the replaceable tip comprises a lead tip, the controller is capable of receiving motion parameters of the input device, the motion parameters corresponding to a writing motion of the lead tip on a writable surface, and the transmitter is capable of transmitting information associated with the motion parameters so as to cause the action.

15. A system comprising:
   at least one sensor associated with an input device, the at least one sensor configured to measure a first parameter indicative of a condition of the input device;
   at least another sensor associated with a touch sensing device, the at least another sensor configured to measure a second parameter indicative of the condition of the input device; and
   a processor associated with the touch sensing device, the processor capable of correlating the first and second parameter measurements so as to confirm the condition of the input device, wherein correlating the first and second parameter measurements so as to confirm the condition of the input device includes comparing the first and second parameter measurements and confirming the condition of the input device when the first and second parameter measurements are sufficiently close.

16. The system of claim 15, wherein the input device is a stylus.

17. The system of claim 15, wherein the input device is at least one of a scanner, a camera, an ultrasound device, or a reader.

18. The system of claim 15, wherein the touch sensing device is at least one of a mobile telephone, a media player, or a personal computer.

19. A method for detecting a condition of an input device at a second device, comprising:
   receiving at the second device at least one measurement from the input device;
   correlating the input device measurement with a sensor measurement from a sensor at the second device corresponding to the at least one measurement from the input device by comparing the input device measurement with the sensor measurement; and determining closeness between the input device measurement and the sensor measurement;
   determining a condition of the input device based on the correlated measurements; and
   performing an action at the second device based on the determined condition.

20. The method of claim 19, wherein determining a condition of the input device comprises:
   at least one of determining whether an end of the input device proximate to the second device is a writing end or an erasing end, determining that the input device is applying pressure to the second device, determining an orientation of the input device relative to the second device, determining a hand position of a user holding the input device, determining an input mode change of the input device, determining a request by the input device for a display color change at the second device, determining an identification of a user of the input device, determining a valid signature of a user signing with the input device, determining an authentication of a user of the input device, determining an authentication of the input device with the second device, determining whether a cap is on or off the input device, determining that the input device is brushing the second device, determining whether the input device is asleep or awake, or determining whether to store input device data.

* * * * *